US007168810B2

(12) United States Patent
Peterson et al.

(10) Patent No.: US 7,168,810 B2
(45) Date of Patent: Jan. 30, 2007

(54) METHOD AND APPARATUS FOR ARRANGING LIGHT EMITTING DEVICES IN PROJECTION SYSTEMS

(75) Inventors: Mark D. Peterson, Lake Oswego, OR (US); T. Scott Engle, Tualatin, OR (US)

(73) Assignee: InFocus Corporation, Wilsonville, OR (US)

( * ) Notice: Subject to any disclaimer, the term of this patent is extended or adjusted under 35 U.S.C. 154(b) by 17 days.

(21) Appl. No.: 10/831,399

(22) Filed: Apr. 23, 2004

(65) Prior Publication Data
US 2005/0237495 A1  Oct. 27, 2005

(51) Int. Cl.
G03B 21/00 (2006.01)
G03B 21/26 (2006.01)

(52) U.S. Cl. .......................................... 353/31; 353/94
(58) Field of Classification Search ................. 353/31, 353/33, 94; 362/231
See application file for complete search history.

(56) References Cited

U.S. PATENT DOCUMENTS

| 5,168,351 | A | * | 12/1992 | Bradley et al. | 348/780 |
| 5,394,204 | A | * | 2/1995 | Shigeta et al. | 353/31 |
| 5,632,545 | A | * | 5/1997 | Kikinis | 353/31 |
| 5,905,545 | A | * | 5/1999 | Poradish et al. | 348/743 |
| 6,224,216 | B1 | | 5/2001 | Parker et al. | |
| 6,309,072 | B1 | * | 10/2001 | Deter | 353/31 |
| 6,612,701 | B2 | * | 9/2003 | Westort et al. | 353/10 |
| 6,644,814 | B2 | | 11/2003 | Ogawa et al. | |
| 6,769,772 | B2 | * | 8/2004 | Roddy et al. | 353/31 |
| 6,834,963 | B2 | * | 12/2004 | Kim et al. | 353/31 |
| 6,899,435 | B2 | * | 5/2005 | Yamanaka | 353/94 |
| 2002/0140911 | A1 | * | 10/2002 | Peterson | 353/99 |
| 2003/0112413 | A1 | * | 6/2003 | Muehlhoff et al. | 353/31 |
| 2005/0190562 | A1 | * | 9/2005 | Keuper et al. | 362/325 |

FOREIGN PATENT DOCUMENTS

EP  0 985 952 A1  3/2000
FR  2 739 982  4/1997

OTHER PUBLICATIONS

Harbers et al., "Performance of High-Power LED Illuminators on Projection Displays," 4 pages.

* cited by examiner

*Primary Examiner*—Christopher Mahoney
(74) *Attorney, Agent, or Firm*—Schwabe Williamson & Wyatt

(57) ABSTRACT

Embodiments of this invention include a system, method and apparatus for combining the light paths of a plurality of colored light emitting devices into a single light path with two reflecting devices and an optical combiner assembly in a projection system.

24 Claims, 4 Drawing Sheets

METHOD AND APPARATUS FOR ARRANGING LIGHT EMITTING DEVICES IN PROJECTION SYSTEMS

FIELD

Disclosed embodiments of the present invention relate to the field of projection systems, and more particularly to the use of a light emitting device illumination arrangement in those projection systems.

BACKGROUND

Multimedia projection systems have become popular for purposes such as conducting sales demonstrations, business meetings, classroom training, and for use in home theaters. In typical operation, projection systems receive video signals from a video unit and convert the video signals to digital information to control one or more digitally driven light valves. Based on this digital information the light valves may manipulate incident light into image bearing light that represents the video image. Recent focus has turned to using light emitting devices such as light emitting diodes (LEDs) as an illumination source to provide the incident light in projection systems.

BRIEF DESCRIPTION OF THE DRAWINGS

Embodiments of the invention are illustrated by way of example and not by way of limitation in the figures of the accompanying drawings, in which the like references indicate similar elements and in which.

DETAILED DESCRIPTION OF EMBODIMENTS OF THE INVENTION

In the following detailed description reference is made to the accompanying drawings that form a part hereof, wherein like numerals designate like parts throughout, and in which is shown, by way of illustration, specific embodiments in which the invention may be practiced. It is to be understood that other embodiments may be utilized and structural or logical changes may be made without departing from the scope of the embodiments of the present invention. Directions such as up, down, back and front may be used in the discussion of the drawings. These directions are used to facilitate the discussion and are not intended to restrict the application of embodiments of this invention. Therefore, the following detailed description is not to be taken in a limiting sense and the scope of the embodiments of the present invention are defined by the appended claims and their equivalents.

Figure 1:
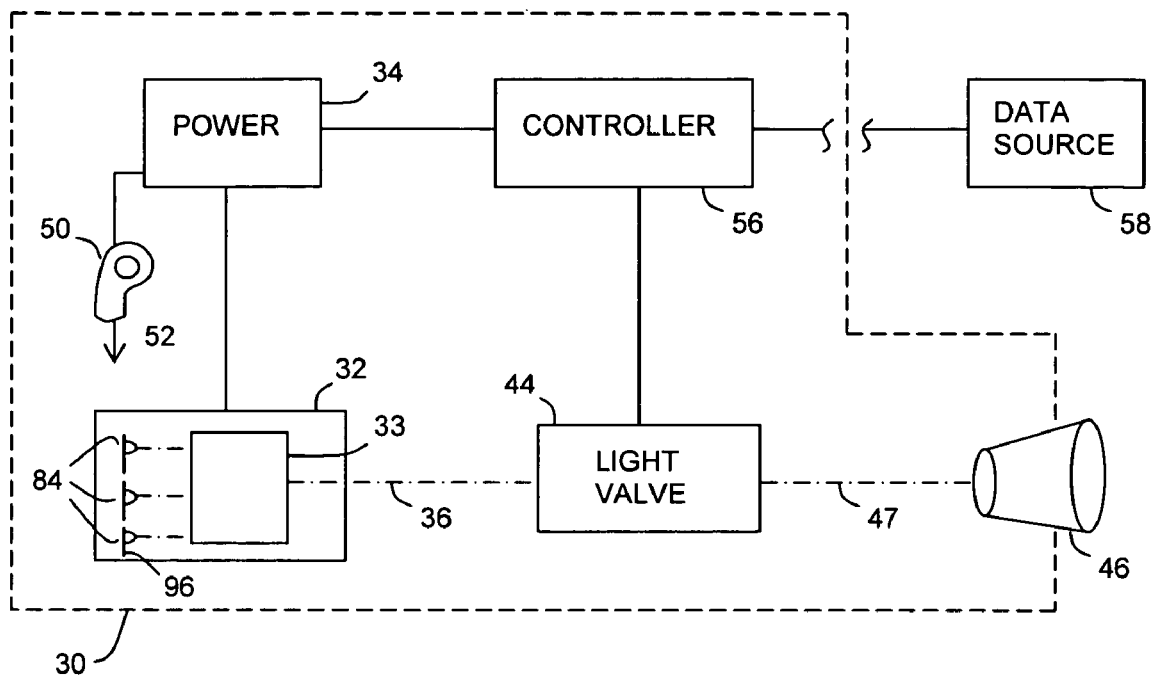
FIG. 1 is a block diagram of a projection system employing an illumination arrangement in accordance with an embodiment of the present invention.

FIG. 1 shows a generic "single path" embodiment of a projection system 30 that employs an illumination arrangement 32 of the present invention. The illumination arrangement 32, which may be coupled to a power supply 34, may include multiple colored light emitting devices 84 situated such that they each emit light from a plane 96. This planar orientation of the light emitting devices 84 may facilitate the assembly and the alignment of the light emitting devices 84 within the illumination arrangement 32. Arranging the light emitting devices 84 as a planar light source may also help to reduce the profile dimensions of the illumination arrangement 32. The light emitting devices 84 may include, but are not limited to, light emitting diodes (LEDs), organic LEDs (OLEDs), and laser diodes (e.g., edge emitting lasers or vertical cavity surface emitting lasers (VCSEL)).

Each of the light emitting devices 84 may emit light within different wavelength ranges representing a variety of colors, along separate, and substantially parallel light paths. The light paths may be combined by an optical combiner assembly 33 into a single light path that could assist in the conservation of the projection system's étendue, or light throughput, by presenting the light of all different colors to downstream components with similar illumination areas and angles.

Light emitted from the illumination arrangement 32 may propagate along a light path 36, impinge upon, and be modulated by, an imaging device such as a light valve 44, and be transmitted through one or more projection lenses 46. An alternative embodiment may use multiple light valves and place them in the light paths of the light emitting devices 84 prior to the optical combiner assembly 33. Additionally, various optical components may be placed in the light paths to adjust for specific design factors of an embodiment.

The light valve 44 may include, but is not limited to, a digital micromirror device (DMD), a reflective liquid crystal on semiconductor (LCOS) array device, and a liquid crystal device (LCD). The projection lens 46 may include, but is not limited to, a fixed focal length lens, a varifocal lens, and a zoom lens.

In one embodiment, the optical components may be held together by an optical frame within a projector housing. The housing may be mechanically rigid and be designed to facilitate the dissipation of heat. The frame and housing may be adapted to accommodate a cooling fan 50 for cooling the optical components by generating an air flow 52. The planar orientation of the light emitting devices 84 may also facilitate the dissipation of excess heat by arranging them on a less-obstructed primary air-flow path. The power supply 34 may be used to power the cooling fan 50 as well as a controller 56.

The controller 56, which may include a microprocessor, may receive color image data representing a color image from a data source 58 and process the image data into control signals including constituent color data (e.g., red, green, and blue data). The control signals may then be conveyed to the light valve 44 in proper synchronism with signals sent to the power supply 34 that control emission time frames of the light emitting devices 84 that emit the corresponding constituent colored light.

Examples of the data source 58 include, but are not limited to, a personal or laptop computer, a digital versatile disk (DVD), a set-top box (STB), an integrated television tuner, and a video camera. The projection system 30 may be implemented in a variety of different applications including, but not limited to, games, movies, television, advertising and data display.

In an embodiment where the light valve 44 is a DMD, the DMD may include a high-density array of digitally deflected mirrors. The controller 56 may send control signals to selectively control each of the mirrors such that the light propagating along the light path 36 may be reflected by a given mirror in the array either toward the projection lens 46, as image bearing light 47, or toward an adjacent light-absorbing surface. The image bearing light 47 may propagate through the projection lens 46 for display on a screen.

In one embodiment the DMD may be a spatial light modulator composed of a rectangular array of aluminum micro-mechanical mirrors, each of which can be individually deflected at an angle of, for example, +/−10 degrees or more about a hinged diagonal axis. The deflection angle (either positive or negative) of the mirrors is individually controlled by changing the memory contents of underlying addressing circuitry and mirror reset signals.

In an embodiment where the light valve 44 is, for example, a transmissive liquid crystal display (LCD), the light path 36 could propagate through it and straight through projection lens 46 without any bends. In this embodiment the light from the illumination arrangement 32 may first be polarized by a polarizer. The polarized light may then be modulated by an informational pattern of liquid crystal pixels in the LCD. The "ON" pixels may transmit the polarized light in a selected pass orientation so that it may pass through a back polarizer (or analyzer) on along the light path 47 as image bearing light. The "OFF" pixels may transmit the light such that it is blocked by the analyzer. The image bearing light may then be directed through the projection lens 46 for viewing. A variety of LCD panels are commercially available and some employ different polarization schemes that could be employed in the present invention.

In an embodiment where the light valve 44 is a LCOS display, a liquid crystal layer on top of a mirrored substrate layer may modulate the light such that is either reflected from the mirrored layer or blocked by polarization filters similar to the LCD display. Specific embodiments of the invention may include general modifications of the optical architecture to adjust for a particular type of light valve 44.

Figure 2:
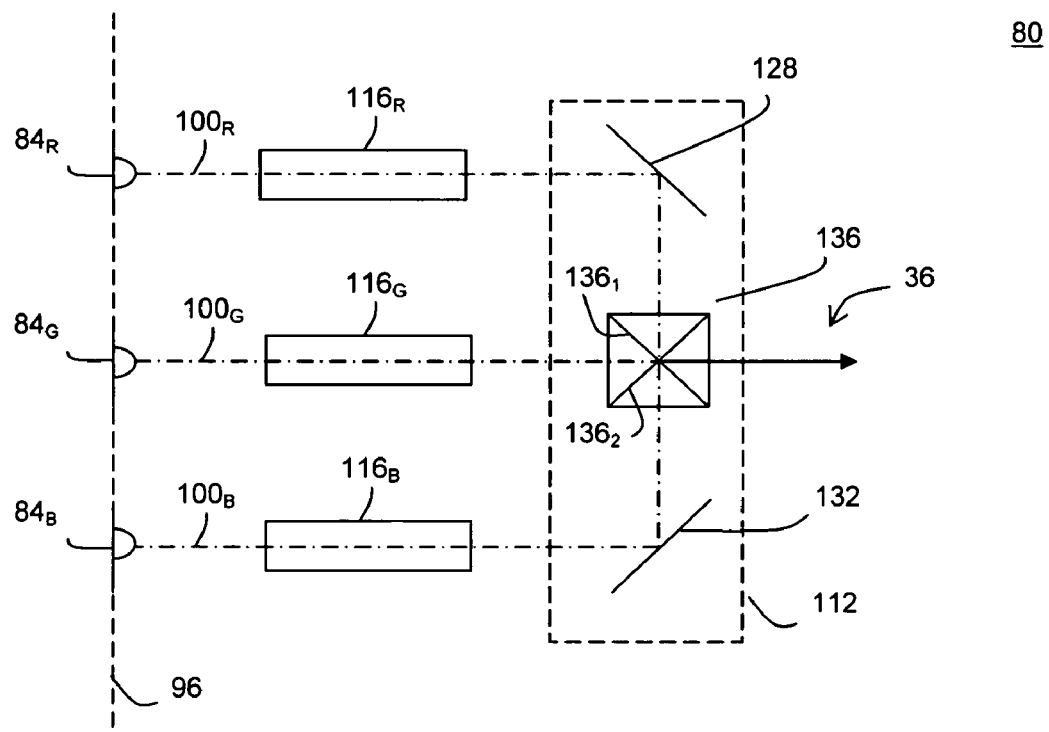
FIG. 2 illustrates an illumination arrangement including an optical combiner assembly to combine substantially parallel light paths into one light path, in accordance with an embodiment of the present invention.

FIG. 2 is a simplified pictorial representation of an illumination arrangement 80 suitable for use in the projection system 30 described in FIG. 1. In one embodiment the illumination arrangement 80 could include three light emitting devices $84_R$, $84_G$, and $84_B$ that are arranged in such a manner that the light is emitted from substantially the same plane 96. The light emitting devices 84 may project light along three different light paths $100_R$, $100_G$, and $100_B$ (which may be substantially parallel to one another) towards an optical combiner assembly 112, which combines the light paths 100 into a single light path 36. In one embodiment, optical integrators may be placed in the respective light paths 100 between the light emitting devices 84 and the optical combiner assembly 112 in order to homogenize and shape the light.

In one embodiment the optical integrators may be elongated integrating tunnels $116_R$, $116_G$, and $116_B$. The integrating tunnels 116 may be composed of a solid glass rod that relies on total internal reflection to transfer light through them and to create, at their output end, a substantially uniform illumination field. The integrating tunnels 116 may include squared off flat surfaces and can also include a cladding or reflective mirrored side walls that may protect internal reflection. An alternative embodiment may include integrating tunnels 116 that are hollow with reflective side walls, which work much the same way optically as the solid glass integrators.

The light emitting devices 84 may each emit wavelengths corresponding to a constituent color. The constituent colors may be thought of as the individual colors that, when combined in the appropriate amounts, create an object color for an image pixel. In one embodiment, each light emitting device 84 may emit at one of the three primary wavelengths, blue, green, and red, at varying efficiencies. Each light emitting device 84 may be a single light emitting device of the desired constituent color, or an array of light emitting devices whose average emissive wavelength corresponds to the desired constituent color.

Although the above embodiment depicts light emitting devices 84 emitting light corresponding to the three primary colors, other colors may be additionally or alternatively employed in other embodiments.

Figure 7:
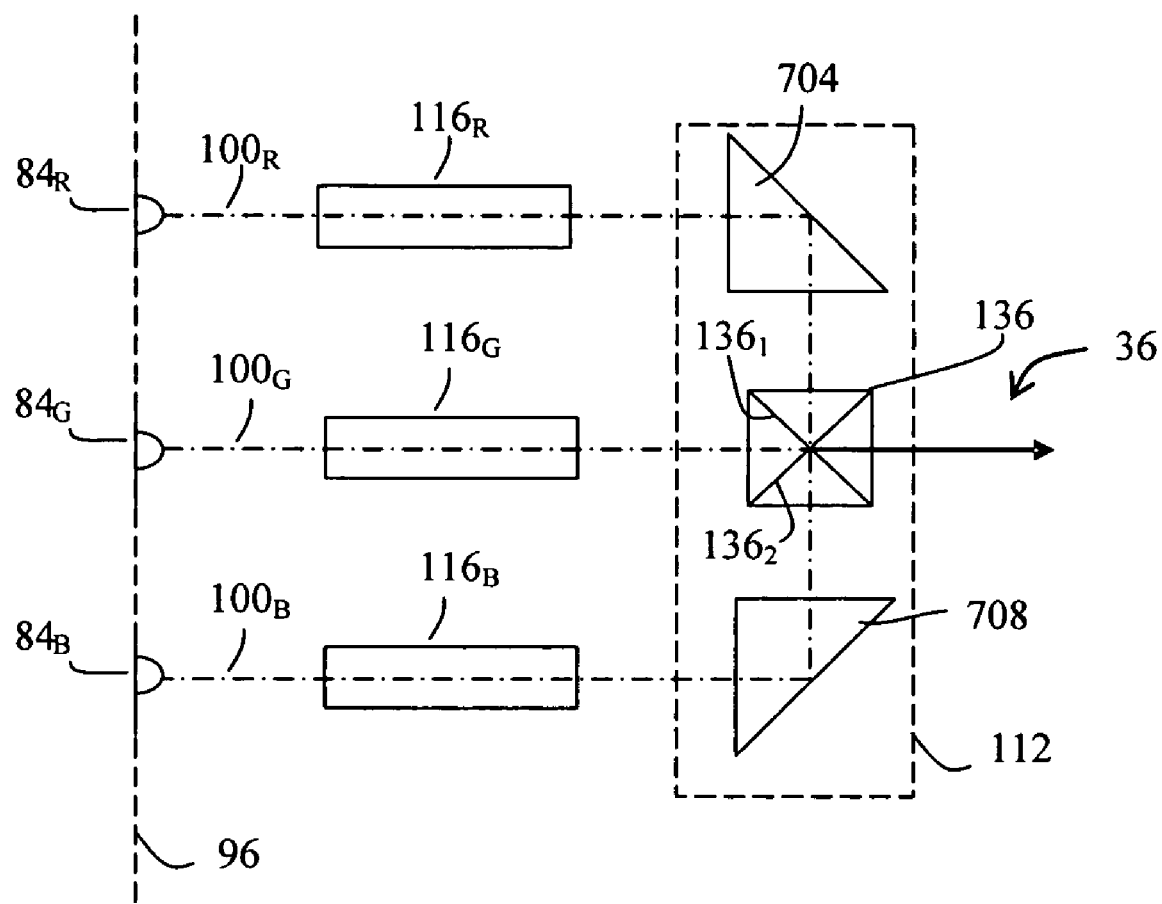
FIG. 7 illustrates an illumination arrangement having prisms as reflecting devices, in accordance with an embodiment of the present invention.

In one embodiment the optical combiner assembly 112' may include a first reflecting device 128, a second reflecting device 132, and an optical combiner 136. The first and second reflecting devices 128 and 132 may include any type of device that is suitable for reflecting light transmitted along the incoming light path towards the optical combiner 136. Examples of reflecting devices that may be used in embodiments include, but are not limited to, planar mirrors, curve mirrors, and prisms. The prisms may include, e.g., total internal reflection (TIR) prisms and/or prisms with a reflective coating applied to at least one face. In one embodiment using reflecting devices 128 and 132 that comprise TIR prisms, e.g.. prisms 704 and 708 depicted in FIG. 7, there may be an air gap that is between a receiving face of the TIR prism and the integrating tunnels $84_R$ and $84_B$ and an air gap between a transmitting face of the TIR prism and the optical combiner 136.

In one embodiment, the optical combiner 136 may include first and second dichroic mirrors $136_1$ and $136_2$, arranged as shown. One embodiment has the two dichroic mirrors 136 embedded into one transparent optical element. The first dichroic mirror $136_1$ may reflect visible wavelengths associated with the light emitting device $84_R$, e.g., wavelengths above 600 nm (red light), and allow other wavelengths to pass. Therefore, red light originating from the light emitting device $84_R$ that is reflected off of the first reflecting device 128 may also be reflected off of the first dichroic mirror $136_1$ and out along the light path 36. Light originating from the green light emitting device $84_G$ and the blue light emitting device $84_B$ may be allowed to pass through the first dichroic mirror $136_1$.

The second dichroic mirror $136_2$ may reflect visible wavelengths associated with the light emitting device $84_B$, e.g., wavelengths below 505 nm (blue light), and allow other wavelengths to pass. Therefore the blue light originating from the light emitting device $84_B$ that is reflected off of the second reflecting device 132 may also be reflected off of the second dichroic mirror $136_2$ and out along the light path 36. Light originating from the green light emitting device $84_G$ and the red light emitting device $84_R$ may pass through the second dichroic mirror $136_2$.

In this embodiment the dichroic mirrors 136 may comprise edge filters that allow a particular band of frequencies to pass, while reflecting other frequencies. However, alternative embodiments, employing various configurations, may use notch filters to reflect a particular band of frequencies.

Combining all of the light paths 100 into a single light path 36 may at least facilitate the conservation of étendue of a projection system. Each optical component of the projection system may have its own étendue, which refers to the size of the light collection cone that the component may process. A component's étendue is a function of its area, normal to the direction of light propagation, its acceptance angle of a solid cone of light, and the refractive index of the component. By presenting light of the constituent colors to the optical components downstream of the optical combiner assembly along the same path, the étendue of those optical components may be conserved by utilizing significant amounts of the acceptance angle.

The light emitting devices 84 may be situated such that the light emits from substantially the same plane 96. This may facilitate the orientation, calibration, and alignment of the light emitting devices 84 with the other optical components. The light emitting devices may be disposed within substantially the same plane by having an optical frame or housing adapted to receive and hold multiple light emitting devices separately, or alternatively, multiple light emitting devices may be on a single substrate prior to positioning the projection system. Additionally, having a planar light source may reduce the package dimensions of the illumination arrangement as well as facilitate the cooling of the devices by making the air path less restrictive.

Figure 3:
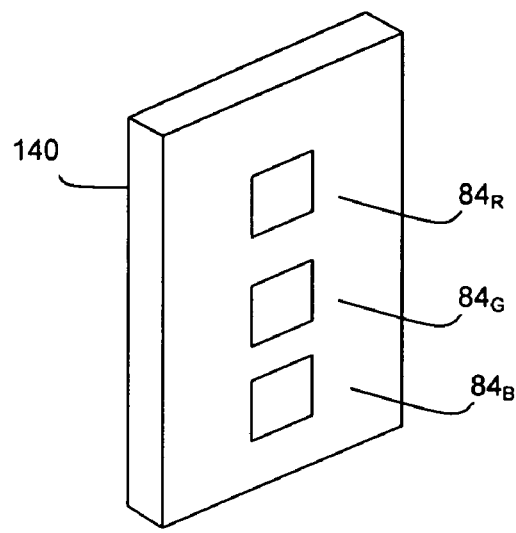
FIG. 3 illustrates multiple light emitting devices disposed on a single substrate, in accordance with an embodiment of the present invention.

FIG. 3 is a pictorial representation of three light emitting devices 84 disposed on a single substrate 140 in accordance with an embodiment of the present invention. In this embodiment, the light emitting devices may include a red light emitting device $84_R$, a green light emitting device $84_G$, and a blue light emitting device $84_B$. In one embodiment, each of the light emitting devices may be packaged individually and mounted onto the same board. Alternative embodiments may include integrating multiple colored light emitting devices onto a single substrate. For example, one embodiment may use organic LEDs (OLEDs) comprising a shared glass substrate, a shared transparent conductor layer (e.g., indium-tin-oxide (ITO)), organic layers (different for each color), and a patterned top metal contact. Another alternative embodiment may include light emitting devices emitting white light being filtered of all but the desired wavelengths, such that only the light within the desired wavelength range is emitted. Having multiple light emitting devices on one electronics board may reduce the number and expense associated with supporting boards and connectors that are not in the plane.

Figure 4:
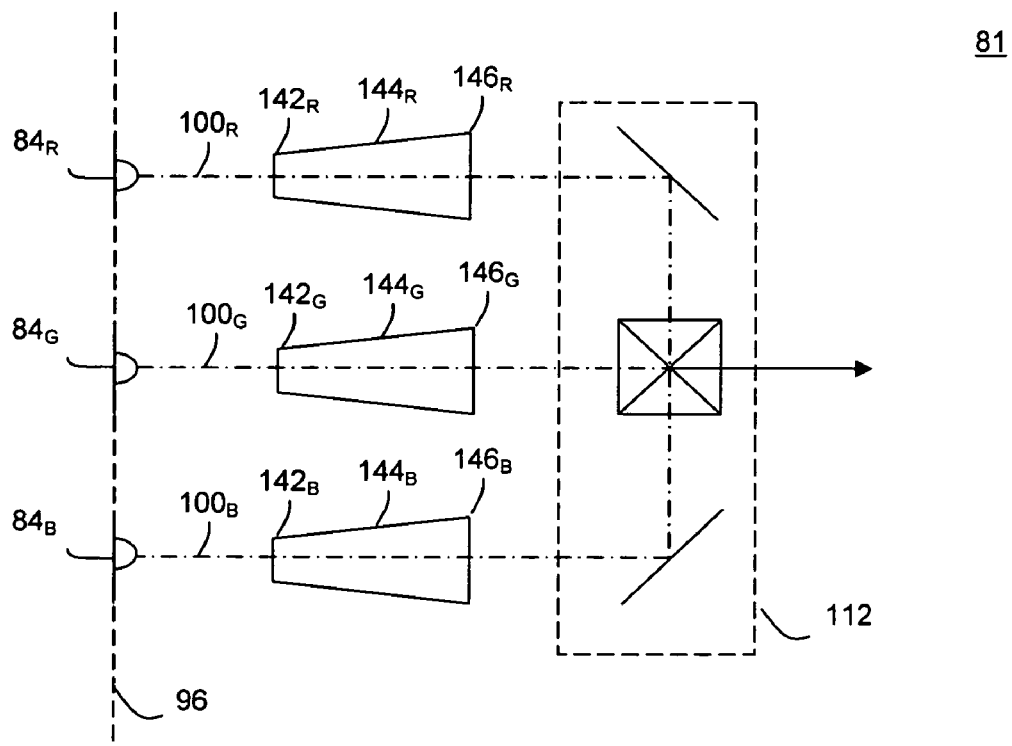
FIG. 4 illustrates an illumination arrangement including tapered integrating tunnels, in accordance with an embodiment of the present invention.

FIG. 4 is a simplified pictorial representation of an illumination arrangement including tapered optical integrators, in accordance with an embodiment of the present invention. In this embodiment the light emitting devices 84, light paths 100, and the optical combiner assembly 112 may be similar to the embodiment of FIG. 2. However the optical integrators of this embodiment may include integrating tunnels 144 with input 142 and output 146 apertures having different cross-sectional sizes and shapes to facilitate collection or presentation of light as desired. For example, in one embodiment the output apertures 146 of the integrating tunnels 144 may be shaped and/or angled to optimally image homogenized light onto an obliquely positioned downstream imaging device. One such optical integrator may include a rectangular input end and an asymmetrical light integrating tunnel that spatially integrates the light into a spatially uniform pattern that exits a nonrectangular output aperture of the tunnel. The uniform illumination exiting the nonrectangular output aperture can be re-imaged by a relay lens onto a reflective light valve that is situated obliquely to the longitudinal axis of the tunnel. The image exiting the nonrectangular output aperture can be intentionally distorted to compensate for any Keystone distortion, illumination overfill regions, and illumination drop-off regions, thereby potentially decreasing light loss while increasing brightness and brightness uniformity across the light valve. Different embodiments within the scope of this invention may include numerous size and shape combinations for the input and output apertures of optical integrator.

The integrating tunnels 144 may have an aspect ratio compatible with one of a number of display standards. Examples of such display standards include, but are not limited to, a 16:9 high definition television (HDTV) format, a 4:3 extended graphics array (XGA) format, and a 16:10 widescreen XGA (WXGA) format. Multiple optical integrators of different cross sections and associated collection and projection optics can be arranged to provide for distinct projection display formats as desired. Additionally, other types of optical integrators may be used in different embodiments of this invention.

Figure 5:
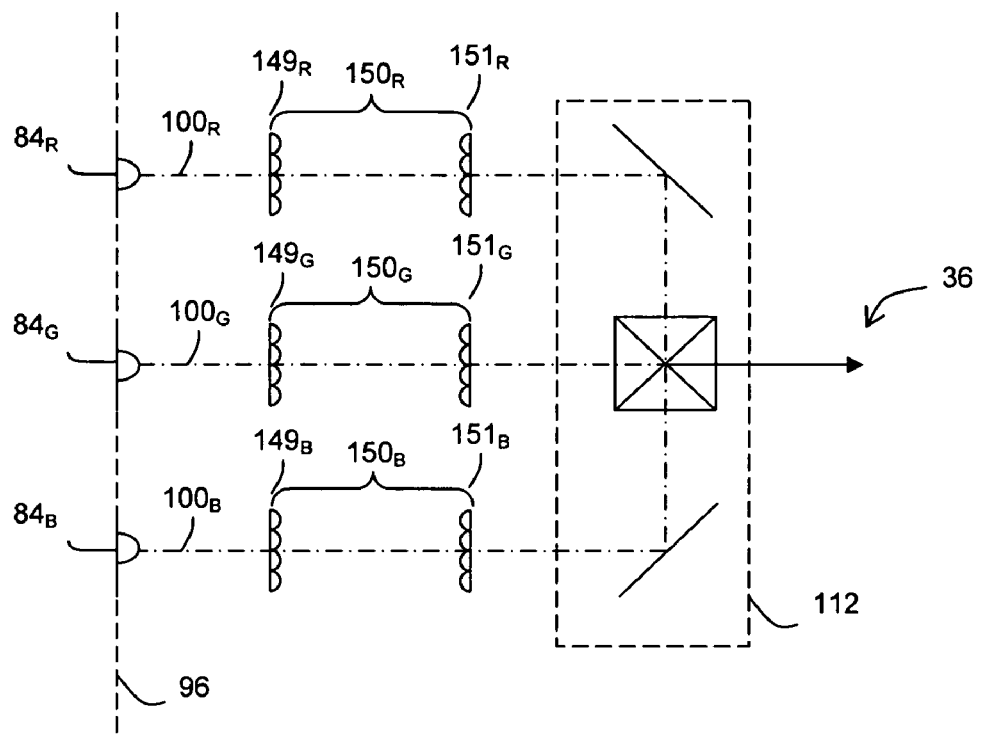
FIG. 5 illustrates an illumination arrangement including flyseye lens integrators, in accordance with an embodiment of the present invention.

FIG. 5 is a simplified pictorial representation of an illumination arrangement including flyseye lens integrators 150, in accordance with an embodiment of the present invention. Each of the flyseye lens integrators 150 may have first 149 and second 151 lenslet arrays. The first lenslet array 149 may include, e.g., a 3-by-5 array of first lenslets, each having the same aspect ratio as a downstream light valve. In an embodiment using a DMD as a light valve, the shapes of the first lenslets may be altered slightly to a rhomboid shape to compensate for the oblique illumination angle. Lenslets of the second lenslet array 151 may be radially symmetric (spherical or aspherical) and have centers of curvature that are selectively offset to receive light rays from the corresponding lenslets of the first lenslet array 149.

Figure 6:
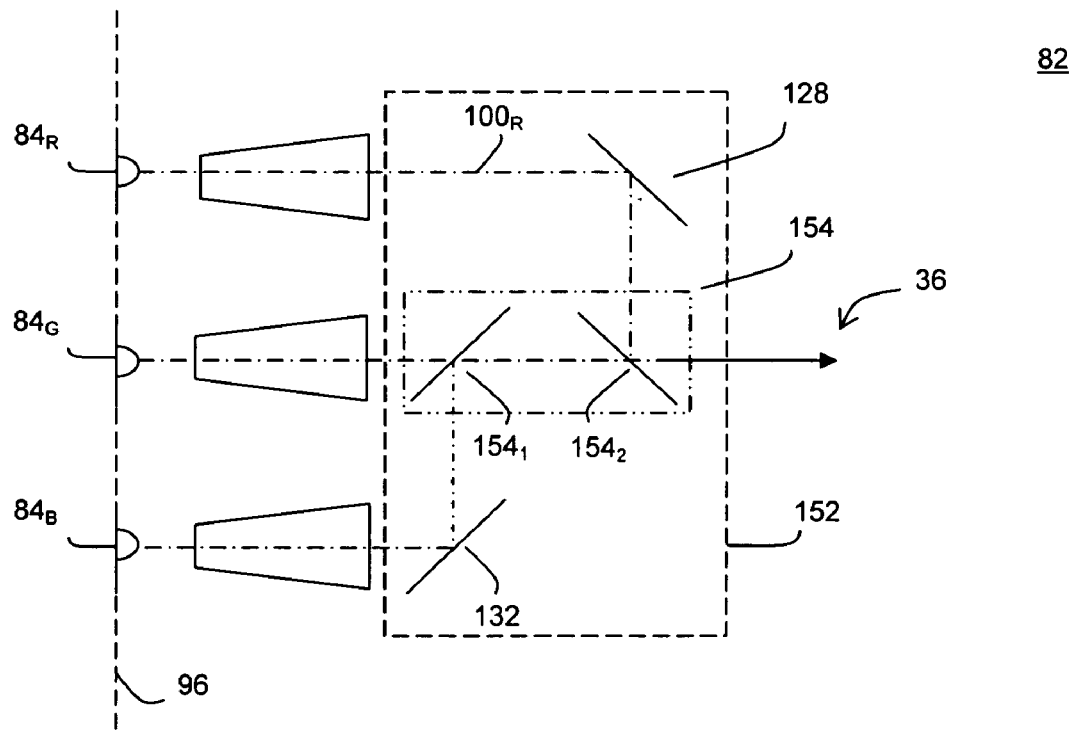
FIG. 6 illustrates an illumination arrangement including an optical combiner assembly with two reflecting devices and two dichroic mirrors, in accordance with an embodiment of the present invention.

FIG. 6 is a simplified pictorial representation of an illumination arrangement including an optical combiner assembly 152 with two reflecting devices and two dichroic mirrors, in accordance with an embodiment of the present invention. This embodiment is similar to FIG. 4, however, the optical combiner 154 is comprised of two dichroic mirrors $154_1$ and $154_2$ that are not crossed with one another. In this embodiment, the dichroic mirrors 154 are not embedded into the same transparent optical element, however, in alternative embodiments they may be. Light from the blue light emitting device $84_B$ may be reflected off of a reflecting device 132, off of the dichroic mirror $154_1$, pass through the second dichroic mirror $154_2$ and travel out along the light path 36. Light from the red light emitting device may be reflected off of a reflecting device 128 and again off of the second dichroic mirror $154_2$ and out along the light path 36. The placement of the mirrors and the light emitting devices may be adjusted in order to accommodate the specifics of a particular embodiment.

The design of modern dichroic mirrors may result in the transmission of some of the light that was intended to be reflected, and the reflection of some of the light that was intended to be transmitted. Therefore, a fraction of the light intended to either pass through both of the dichroic mirrors $154_1$ and $154_2$ or reflect off one dichroic mirror and pass through the other, may be inadvertently directed along an incorrect path (e.g., not the imaging light path). One embodiment may account for the inadvertent direction by placing a less efficient light emitting device, e.g., the green light emitting device 84G, in a path that would have the least loss due unintended redirection of light. The determination of this path may be dependent on the types and orientation of the dichroic mirrors of a specific embodiment, as well as the wavelengths of light emitted from the light emitting devices 84.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a first light emitting device to emit light within a first wavelength range from a plane along a first light path;
   a second light emitting device to emit light within a second wavelength range from the plane along a second light path;
   a third light emitting device to emit light within a third wavelength range from the plane along a third light path;
   first, second, and third optical integrators each having an input aperture to receive light from the respective first, second, and third light emitting devices; and an output aperture to transmit substantially integrated light along the respective first, second, and third light paths;
   wherein each of the first, second and third optical integrators comprise one of a group consisting of a flyseye-lens integrator and an integrating tunnel;
   first and second reflecting devices to receive light along the respective first and second light paths and to reflect the light towards an optical combiner;
   the optical combiner to receive light from the first reflecting device at a first side, the second reflecting device at a second side, and the third light emitting device at a third side, and to transmit light along a fourth light path from a fourth side; and
   a light valve, having an aspect ratio, optically coupled to the optical combiner to receive light from the optical combiner, and to modulate the light into image bearing light.

2. The apparatus of claim 1, wherein the third light path is substantially in line with the fourth light path.

3. The system of claim 2, where in the optical combiner comprises:
   first and second dichroic mirrors on the third light path to transmit at least a portion of light of the third wavelength along the fourth light path;
   the first dichroic mirror to receive light of the first wavelength from the first reflecting device and to reflect at least a portion of the light of the first wavelength along the fourth light path; and
   the second dichroic mirror to receive light of the second wavelength from the second reflecting device and to reflect at least a portion of the light of the second wavelength along the fourth light path.

4. The system of claim 2, wherein each of the first, second and third light emitting devices emit one of a group consisting of red, green and blue light.

5. The apparatus of claim 1, wherein the optical combiner comprises:
   first and second dichroic mirrors on the third light path to transmit at least a portion of light within the third wavelength range along the fourth light path;
   the first dichroic mirror to receive light within the first wavelength range from the first reflecting device and to reflect at least a portion of the light along the fourth light path; and
   the second dichroic mirror to receive light within the second wavelength range from the second reflecting device and to reflect at least a portion of the light along the fourth light path.

6. The apparatus of claim 5, wherein the first and second dichroic mirrors are crossed with one another and embedded into a transparent optical element.

7. The apparatus of claim 1, wherein each of the first and second reflecting devices comprise one of a group consisting of a prism and a planar mirror.

8. The apparatus of claim 1, wherein at least one of the first and second reflecting devices comprise a total internal reflecting prism having
   a first face to receive light from a respective output aperture, with an air gap between the first face and the output aperture; and
   a second face to transmit light toward the optical combiner, with an air gap between the second face and the optical combiner.

9. The apparatus of claim 1, wherein the output apertures of the first, second, and third optical integrators each have an aspect ratio corresponding to the aspect ratio of the light valve.

10. The apparatus of claim 9, wherein
    the input apertures of the optical integrators have a size and shape;
    the output apertures of the optical integrators have a size and shape; and
    at least one of the size and shape differ between the input apertures and the output apertures.

11. The apparatus of claim 1, wherein each of the first, second, and third light emitting devices generate light during respective first, second, and third emission time frames.

12. The apparatus of claim 1, wherein the light emitting devices comprise light emitting diodes.

13. A system comprising:
    an illumination arrangement including
       a first light emitting device, situated in a plane, to emit light within a first wavelength range along a first light path,
       a second light emitting device, situated in the plane, to emit light within a second wavelength range along a second light path,
       a third light emitting device, situated in the plane, to emit light within a third wavelength range along a third light path,
       a first, second and third optical integrator, situated on the first, second, and third light paths, respectively,
       a first and second reflecting devices to receive light along the respective first and second light paths and to direct the light towards an optical combiner,
       the optical combiner to receive light from the first reflecting device, the second reflecting device, and the third light emitting device, and to transmit light along a fourth light path;
    a controller adapted to receive color image data from a data source and to send control signals to an image device based on the color image data; and the imaging device, to receive the control signals, to receive the light from the optical combiner, and to modulate the light based, at least in part, on the control signals.

14. The system of claim 13, wherein the first, second, and third optical integrators, each include an output aspect ratio which corresponds to an aspect ratio of the imaging device.

15. The system of claim 2, wherein the imaging device comprises a device selected from the group consisting of a digital micromirror device, a liquid crystal on silicon device, and a liquid crystal display.

16. The system of claim 2, in which the data source comprises a source selected from the group consisting of a personal computer, a digital versatile disk, a set-top box, and a video camera.

17. The system of claim 2, wherein the light emitting devices comprise light emitting diodes.

18. An apparatus comprising:
 a first, second, and third optical integrators to receive light of a first, second, and third color along respective first, second, and third light paths;
 a first reflecting device configured to receive light of the first color along the first light path;
 a second reflecting device configured to receive light of the second color along the second light path;
 an optical combiner configured to receive light reflected from the first reflecting device at a first side, to receive light reflected from the second reflecting device at a second side, and to receive light of the third color along the third light path at a third side, and to transmit light along a fourth light path from a fourth side; and
 an imaging device configured to receive light from the optical combiner and to modulate the light.

19. The apparatus of claim 18, further comprising:
 first, second, and third light emitting devices disposed in a plane and configured to provide light of the first, second, and third colors, respectively.

20. The apparatus of claim 19, wherein the first, second, and third light emitting devices comprise light emitting diodes co-disposed on a substrate.

21. A method comprising:
 integrating light of a first color with a first optical integrator, integrating light of a second color with a second optical integrator, and integrating light of a third color with a third optical integrator;
 reflecting light of the first color with a first reflecting device towards an optical combiner;
 reflecting light of the second color with a second reflecting device towards the optical combiner;
 receiving light of the third color with the optical combiner;
 transmitting, from the optical combiner, the light of the first, second, and third colors;
 receiving and modulating, with an imaging device, the light of the first, second, and third colors from the optical combiner.

22. The method of claim 21, further comprising:
 providing the light of the first color to the first reflecting device from a first light source along a first light path;
 providing the light of the second color to the second reflecting device from a second light source along a second light path; and
 providing the light of the third color to the optical combiner from a third light source along a third light path.

23. The method of claim 22, wherein said providing of the light of the first, second, and third colors further comprises:
 providing the light of the first color during a first emission time frame;
 providing the light of the second color during a second emission time frame that is at least partly non-overlapping with the first emission time frame; and
 providing the light of the third color during a third emission time frame.

24. The method of claim 23, further comprising:
 controlling the imaging device to modulate the light of the first, second, and third colors during respective first, second, and third emission time frames.

* * * * *